United States Patent [19]

McGlade

[11] Patent Number: 5,227,230

[45] Date of Patent: Jul. 13, 1993

[54] THERMAL CONTROL MATERIALS

[75] Inventor: Gordon J. A. McGlade, Edinburgh, Scotland

[73] Assignee: W. L. Gore & Associates, Inc., Newark, Del.

[21] Appl. No.: 762,294

[22] Filed: Sep. 19, 1991

[30] Foreign Application Priority Data

Sep. 19, 1990 [GB] United Kingdom ............... 9020428

[51] Int. Cl.$^5$ .......................... B32B 5/14; B32B 3/26; B32B 27/00
[52] U.S. Cl. .............................. 428/319.1; 428/309.9; 428/316.6; 428/422
[58] Field of Search ............... 428/319.1, 309.9, 316.6, 428/422

[56] References Cited

U.S. PATENT DOCUMENTS

| | | | |
|---|---|---|---|
| 2,786,792 | 3/1957 | Mikisha | 428/316.6 |
| 4,096,227 | 6/1978 | Gore | 264/210 R |
| 4,230,057 | 10/1980 | Kurz | 112/420 |
| 4,232,620 | 11/1980 | Kurz | |
| 4,508,776 | 4/1985 | Smith | 428/248 |
| 4,547,424 | 10/1985 | Suzuki | 428/316.6 |
| 4,557,957 | 12/1985 | Manniso | 428/36 |
| 4,576,861 | 3/1986 | Kato | 428/316.6 |
| 4,640,866 | 2/1987 | Suzuki | 428/422 |
| 4,781,969 | 11/1988 | Kobayashi et al. | 428/209 |
| 4,857,381 | 8/1989 | Suzuki | 428/120 |
| 4,911,771 | 3/1990 | Tanaka et al. | 428/248 |

FOREIGN PATENT DOCUMENTS 0160439 6/1985 European Pat. Off. .

Primary Examiner—George F. Lesmes
Assistant Examiner—Chris Raimund
Attorney, Agent, or Firm—Gary A. Samuels

[57] ABSTRACT

A thermal control material which is flexible and highly conformable comprises a thin substrate of porous expanded polytetrafluoroethylene which has been metallized on one of its surfaces by vacuum deposition to provide a thin metal film (usually aluminum). A multilayer construction is made up by joining together a plurality of metallized layers at intervals over the areal extent of the construction, e.g. by discontinuous stitching or by adhesive spots. The material is light, strong and has excellent drape characteristics, together with good thermal insulation properties.

5 Claims, 1 Drawing Sheet

THERMAL CONTROL MATERIALS

FIELD OF THE INVENTION

This invention relates to thermal control materials and constructions and, more particularly, to shape-conformable lightweight thermal control constructions.

BACKGROUND OF THE INVENTION

Many types of equipment, instruments apparatus structures and structure surfaces used for example in industrial and communication system environments are adversely affected by temperature extremes and sudden variations in temperature which are commonplace in such environments. To ensure their proper operation these devices should be kept at uniform temperatures within specified temperature limits.

There are various ways known to accomplish such temperature control, for example, by using auxiliary equipment to control temperatures inside equipment and instrument enclosures or within the structures housing the devices. These, however, suffer the drawbacks of excessive bulkiness, weight and energy usage and are undesirable for applications where space, load carrying ability and available energy are limited.

An alternative method to control heat transfer to and from surfaces and enclosures is the use of high efficiency thermal control materials. These have the advantages of relatively low bulkiness, light weight and no energy usage. Such thermal control materials are normally applied closely to the surfaces and structures which they are to control.

Commonly used thermal control materials are Kapton (trademark) polyimide and polyolefin plastic films with metallized surfaces that are formed into multilayer constructions. Between layers of the plastic films is typically placed an open porous spacer material such as a light fabric or nonwoven scrim to prevent contact of the film layers. The multilayer construction is then placed as closely as possible to the surface or structures and attached to them. Such constructions, although light and strong, have disadvantages such as poor drapability, conformability and tear strength and are difficult to use except on smooth regular surfaces.

It can be seen then that the multilayer construction should be sufficiently strong, tough and flexible to withstand the rigours of assembly and use without appreciable deterioration in integrity and performance. It should also be highly conformable and easily shaped in order to be closely attached to irregularly shaped surfaces and structures without damage. It is often very important that the construction be ultra lightweight, for example, for use in aerospace applications.

The construction must also be capable of reducing all three modes of heat transfer; conduction, convection and radiation in order to minimize heat transfer to and from the structures it is attached to. Additionally, the construction may also be required to be electrically conductive in three dimensions in order for it to be used as a path to conduct electrostatic charges to a common ground.

Kurz U.S. Pat. No. 4,232,620 discloses a thermal insulation material made up of alternating layers of nylon mesh and polyethylene film which are stitched together.

Manniso U.S. Pat. No. 4,557,957 discloses coating porous expanded polytetrafluoroethylene (PTFE) with a metal such as copper, cobalt, silver, gold, platinum or rhodium by electroplating in conjunction with electroless plating. The object is to provide inter-pore metal coatings which encapsulate both interior and exterior surfaces of the porous PTFE whilst maintaining its microporosity. The metal therefore does not just lie on one surface of the PTFE but lies throughout the porous structure.

SUMMARY OF THE INVENTION

The present invention provides a thermal control material which is a layered construction comprising at least two layers, each layer being made of microporous expanded polytetrafluoroethylene which has been metallised on one of its surfaces to provide a thin metal film, the layers of the construction being arranged so that the metallised surface of one layer is adjacent to the untreated surface of the adjacent layer. The layered construction may have two or more layers and the layers may be joined together at intervals over the areal extent of the construction to provide structural integrity.

The metal film may be vacuum deposited aluminium.

By virtue of the present invention heat transfer by conduction is reduced first by the inherent low thermal conductivity of porous expanded polytetrafluorethylene and secondly by the structure of the porous polytetrafluoroethylene substrate layer which provides a tortuous continuous path of polytetrafluoroethylene from one side to the other which is much longer than the thickness of the layer.

Also, heat transfer by convection is low, due to the small pores, tortuousity and high pore volume of the structure of the porous polytetrafluoroethylene layer. The PTFE structure which may have a pore volume as high as 90%, preferably 80% (and particularly 70%) serves as baffles to air currents and resists influence by external air movement thus effectively creating dead air space which is a good insulator. In vacuum and other low pressure applications there is little or no air within the pores so heat transfer by convection is virtually nil.

Heat transfer by radiation is reduced by the good absorption and emissivity characteristics of the metallized porous polytetrafluorethylene material and can be further reduced by increasing the number of layers of the construction. A further advantage which is imparted by the irregular surface finish of the metallised porous polytetrafluoroethylene material is that reflectance form the surface is diffuse rather than specular thus reducing inadvertent focusing of incident radiant energy to a spot where it could cause damage.

This invention also provides a novel material with excellent drape characteristics which permit it to closely follow and be snugly attached to irregular contours and shapes if desired, thus minimizing bulkiness and space occupancy. Additionally, it is sufficiently strong and tough to be stretched over surface irregularities for the purpose of streamlining or concealing surface irregularities.

The layered construction provides a material that is sufficiently tough and resistant to tearing that it can be easily handled and can be readily attached to other devices by mechanical means such as screws, rivets, staples and the like or by adhesives such as polyurethane adhesives, or epoxy adhesives The multilayer construction is also ultra lightweight each layer being only about half the weight of a layer of the known Kapton construction. The porous polytetrafluoroethylene layers have very low bulk density due to the porosity of the material. The layers, being porous, also provide the same function as the porous spacer materials sue din conventional multilayer constructions and, as a result, do not require that additional spacer materials be interposed between the layers. The layers may be joined together by stitching or by localised adhesive bonding and in either case the joint may be electrically conductive so that all of the metallised films of the construction are electrically interconnected at intervals over the areal extent of the construction.

For example, the layers could be stitched using a thread containing electrically conductive carbon in order to disperse static electricity.

BRIEF DESCRIPTION OF THE DRAWINGS

An embodiment of the present invention will now be described by way of example with reference to the accompanying drawings, in which.

DETAILED DESCRIPTION OF PREFERRED EMBODIMENT

Figure 1:
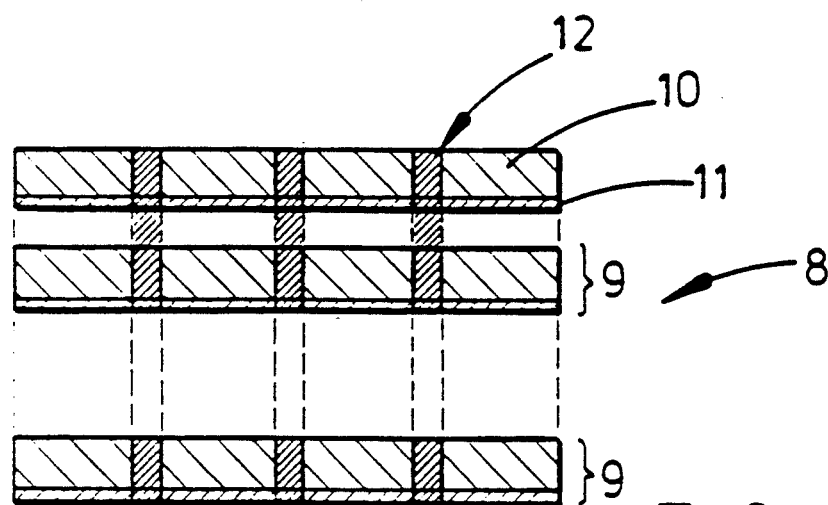
FIG. 1 is an exploded cross-section view of a multi-layered construction of thermal control material, with the layers joined by spot stitching.
Figure 2:
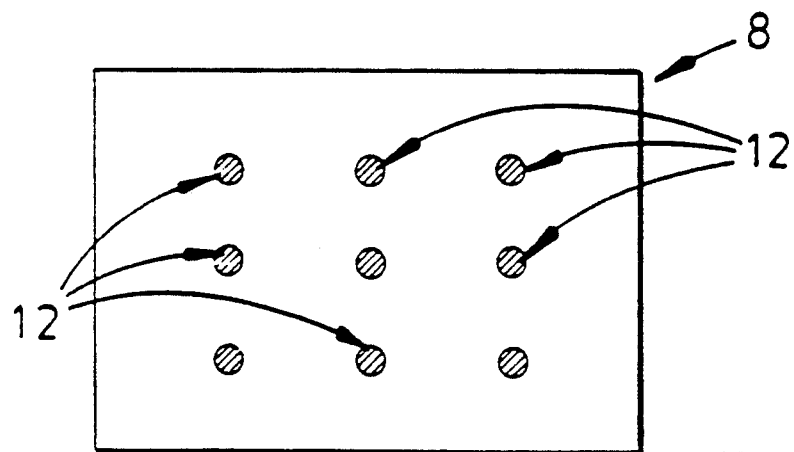
FIG. 2 is a top view of the embodiment of FIG. 1.

First, porous polytetrafluoroethylene film or substrate 10 is metallized on one surface to provide a metal film 11 by means well known in the art, including vapor deposition, sputter coating, electroless- and electrochemical deposition and the like in order to provide a thermal control material 9. The metal film 11 is deposited so as to be a surface coating on substrate 10 with minimal penetration into the pores of the substrate 10. The preferred film 10 is porous expanded polytetrafluoroethylene made in accordance with U.S. Pat. No. 4,187,390 and U.S. Pat. No. 3,956,566. The preferred metal for the metallisation is aluminum, however, for applications for which aluminum is unsuited, other metals and materials with the required properties may be used, for example, noble metals, ferromagnetic metal, refractory metals, conductive oxides and the like.

Metallizing is used herein to mean the application of metal 11 to the porous polytetrafluoroethylene surface at least to a thickness such that the surface characteristics of the metallised material are associated with those of the applied metal. The preferred thickness range is 1000 to 2000 Angstroms but, depending on the end use, more or less may be used. When coating 11 is of vacuum deposited aluminium to a thickness of 1000 Angstroms the coating 11 is stable and oxidation thereof is minimised. The coating 11 has a dull appearance due to the irregular surface finish imposed on it by the porous film 10.

The material 9 is arranged in layers, with the metallized surface 11 facing the untreated surface of the next layer in order to form a multilayered construction 8. The number of layers used in the construction 8 is at least two, but can be as many as twenty or more depending on the insulation value required by an application. The layers, once arranged, are joined together to form a handleable construction 8 which has structural integrity and can be cut to specific end-use shapes and applied to surfaces without loss of proper alignment of the various layers. It is important that joining the layers be done in such a manner that the heat transfer characteristics of the composition be influenced as little as possible. A preferred method to accomplish this is to joint the layers at widely spaced discrete spots by discontinuous means using low thermal conductivity materials, for example, by local stitching with expanded polytetrafluoroethylene thread 12 or with an adhesive dot, for example, of Thermogrip Brand hot melt adhesive. Spacing of the joints is typically at four inch to twelve inch (10-30 cm) intervals but may be more or less depending on the stresses to which the composition will be subjected.

Electrical conductivity to remove electrostatic charges is provided in a surface plane of each layer by the metal coating 11 applied to one surface of the porous polytetrafluoroethylene film 10. When interlayer electrical conductivity to remove electrostatic charges is required electrically conductive joint materials, for example, threads of carbon fibres are used to join the layers and provide an electrically conductive path through the composition 8.

I claim:

1. A thermal control material which is a layered construction consisting essentially of at least two layers; each said layer being made of porous expanded polytetrafluoroethylene which has been metallized on one of its surfaces to provide a thin metal film on its porous surface; said layers being arranged such that the metallized surface of each said layer is adjacent to the untreated surface of the adjacent layer, and said layers being joined together at intervals over the areal extent of the construction.

2. A thermal control material as claimed in claim 1, wherein the layers are joined together at intervals over the areal extent of the construction by discontinuous stitching.

3. A thermal control material as claimed in claim 1, wherein the layers are joined together at intervals over the areal extend of the construction by an electrically conductive material so that the respective metal films of the construction are electrically interconnected at intervals over the areal extent of the construction.

4. A thermal control material as claimed in claim 1, wherein the layers are joined together at intervals over the areal extent of the construction by adhesive.

5. A thermal control material as claimed in claim 1, wherein the thin metal film is aluminium having a thickness of at least 1000 Angstroms.

* * * * *